Inventors
David F. Rutland
Roger E. Lagerquist
Ernest F. Blase

By Attorneys Cadwalader, Kelly & Dacey

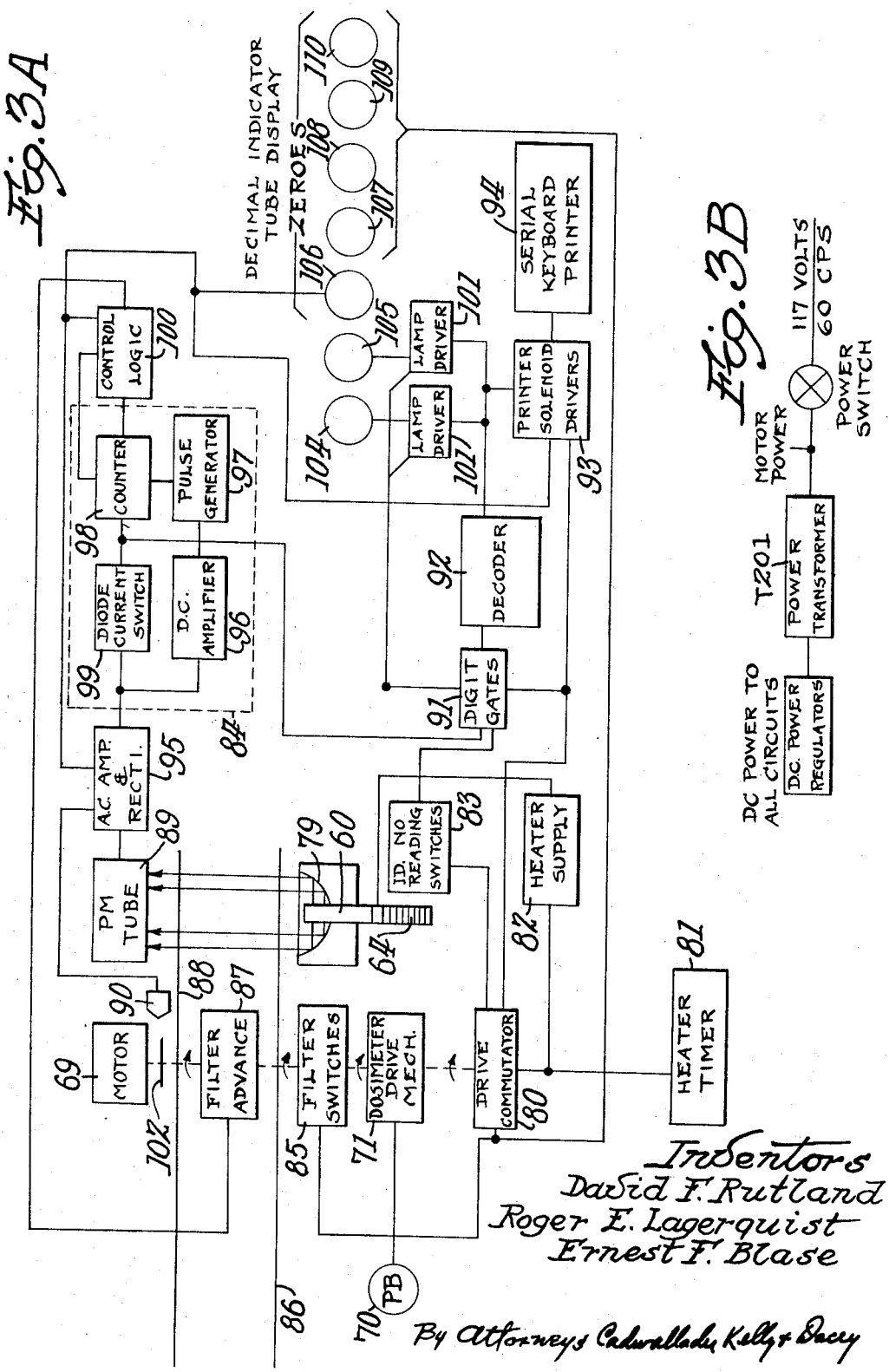

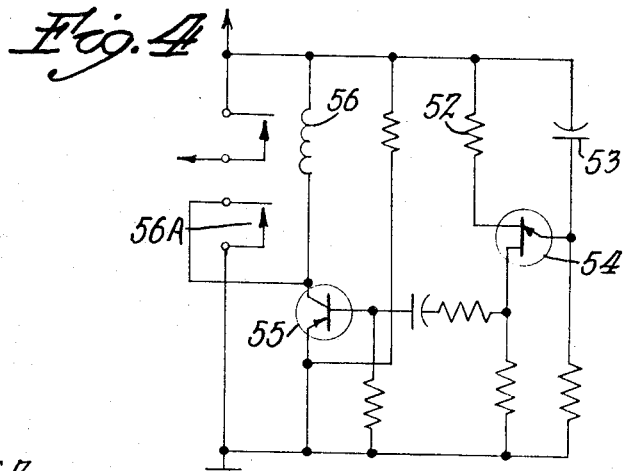
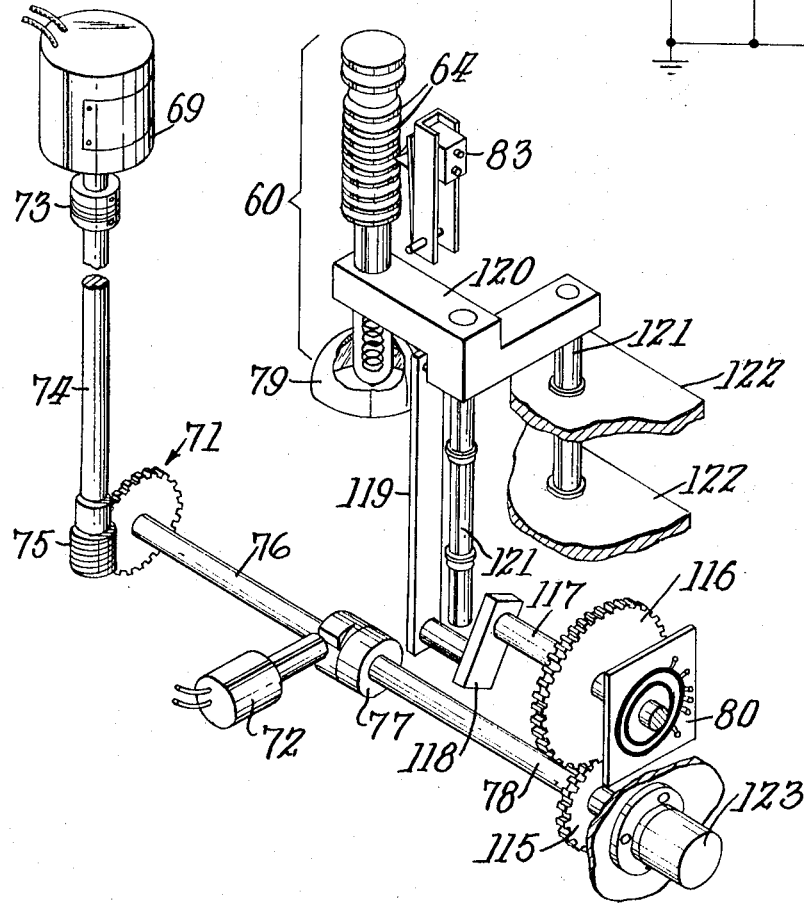
Inventors
David F. Rutland
Roger E. Lagerquist
Ernest F. Blase
By Attorneys Cadwallader Kelly & Dacey

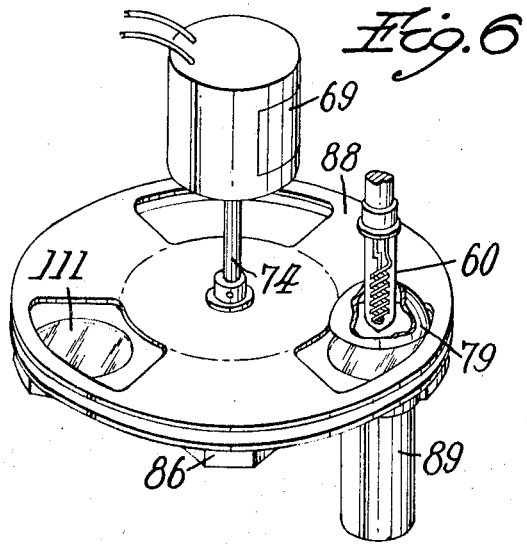
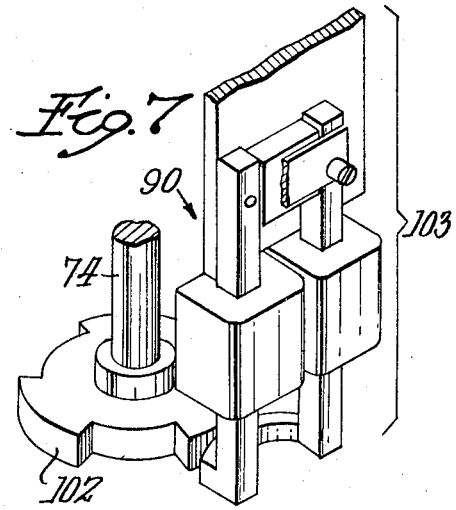
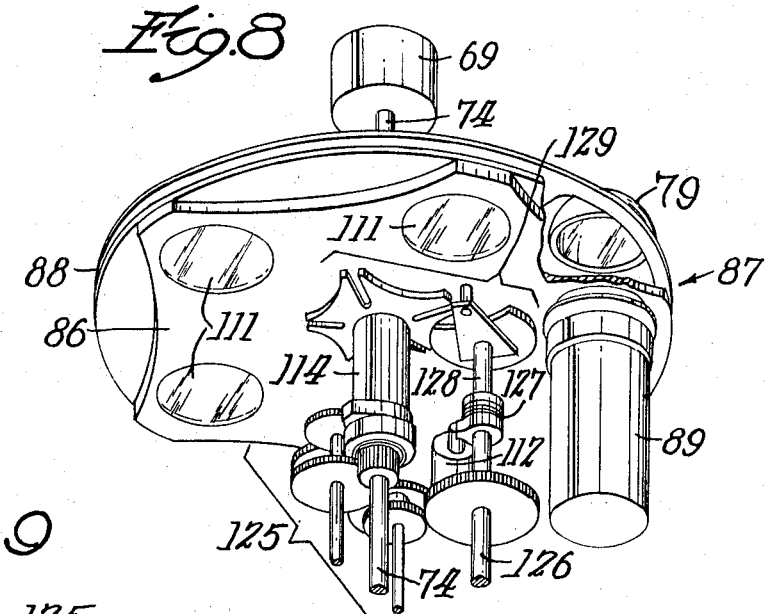
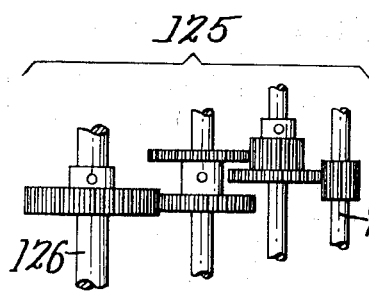

Feb. 27, 1968    D. F. RUTLAND ET AL    3,371,209
AUTOMATIC READING APPARATUS FOR THERMOLUMINESCENT
TYPE RADIATION DOSIMETERS
Filed Sept. 11, 1964    12 Sheets-Sheet 5
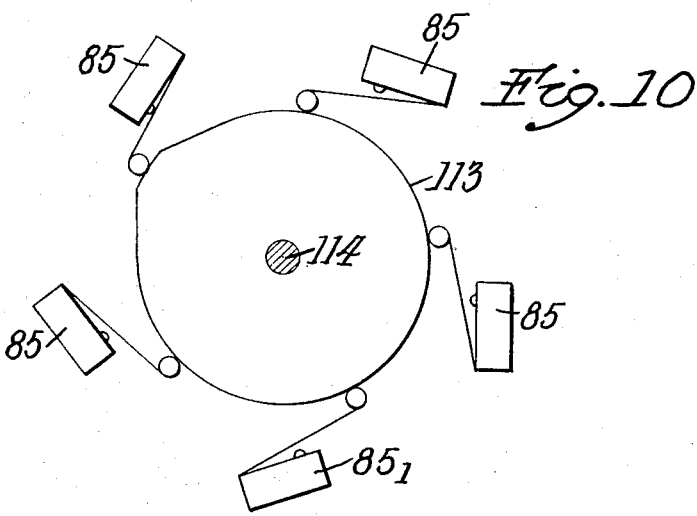
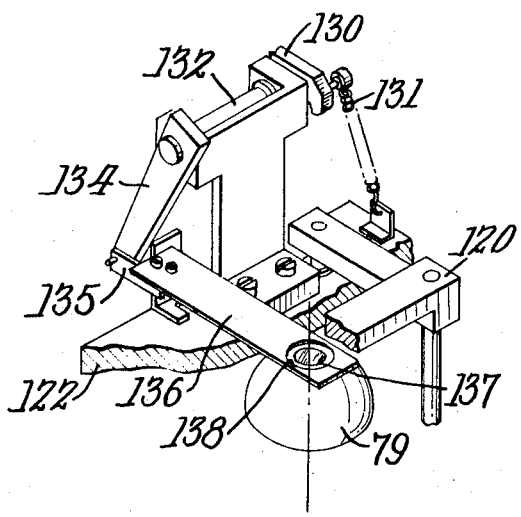
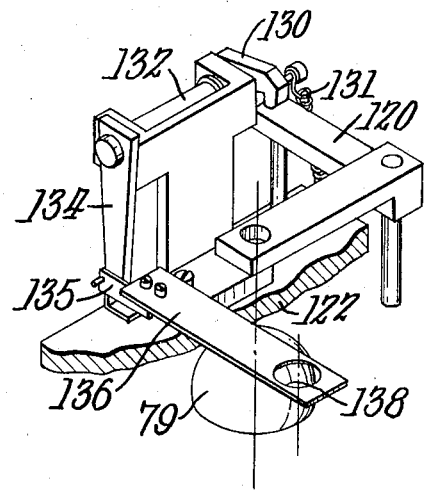
Inventors
David F. Rutland
Roger E. Lagerquist
Ernest F. Blase
By Attorneys Cadwallader, Kelly & Dacey Inventors
David F. Rutland
Roger E. Lagerquist
Ernest F. Blase
By Attorneys Cadwallader Kelly & Dacy

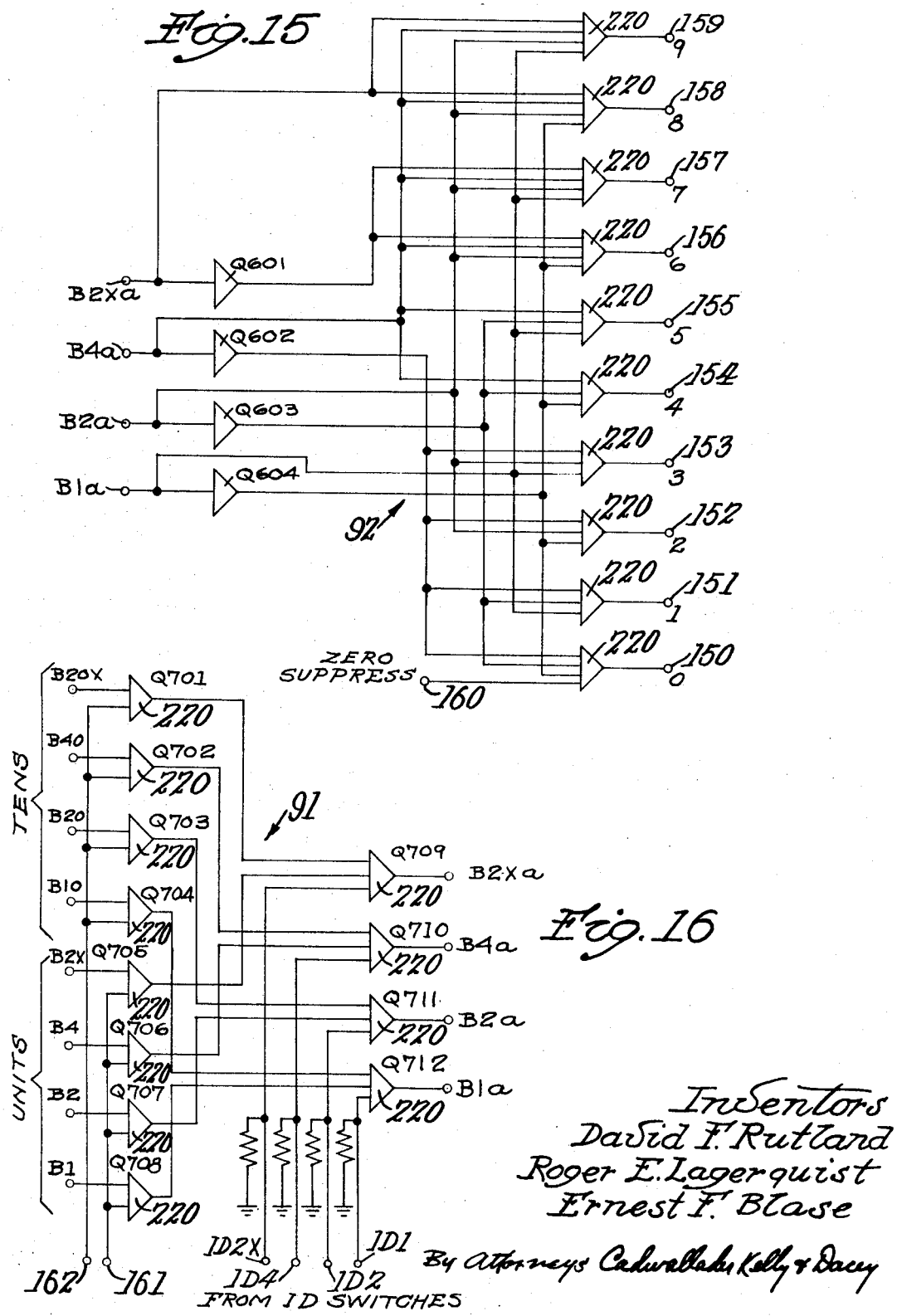

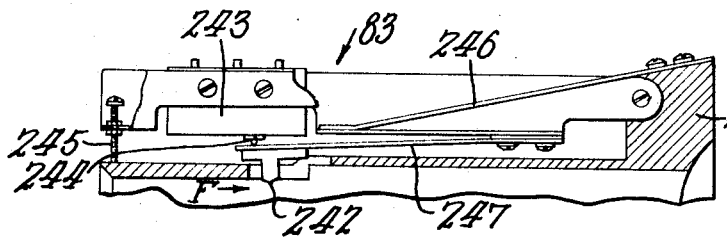
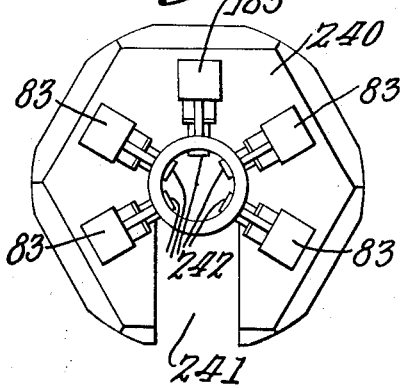
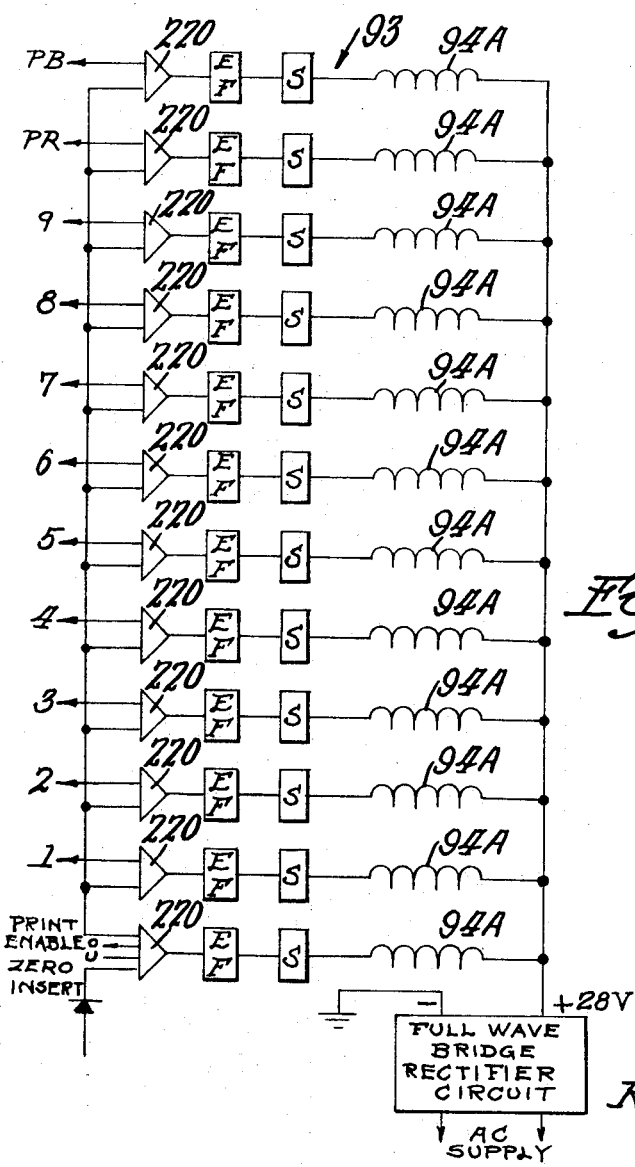

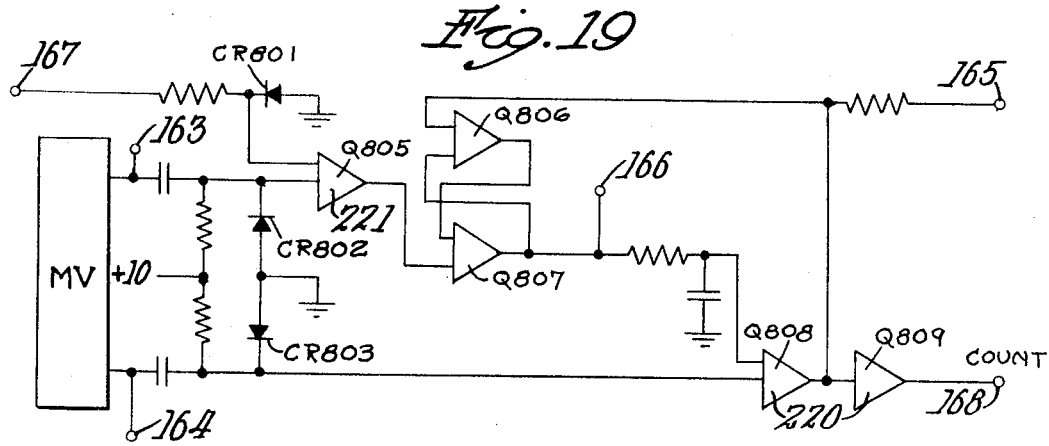
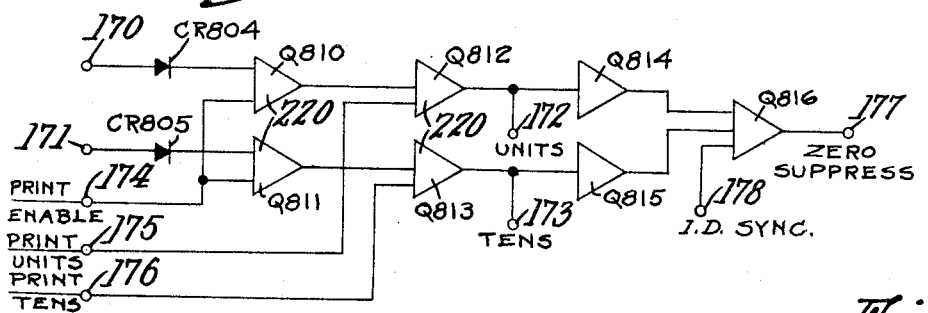
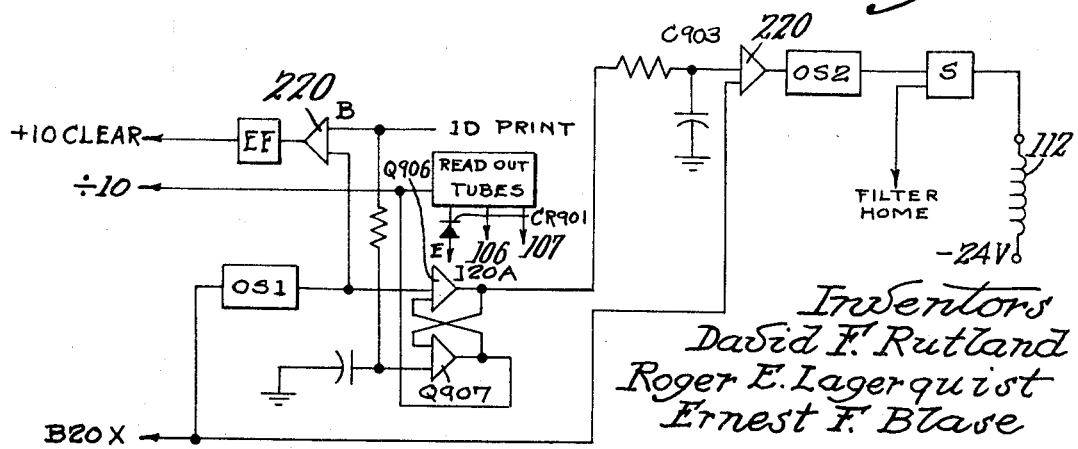

Feb. 27, 1968  D. F. RUTLAND ETAL  3,371,209
AUTOMATIC READING APPARATUS FOR THERMOLUMINESCENT
TYPE RADIATION DOSIMETERS
Filed Sept. 11, 1964  12 Sheets-Sheet 11
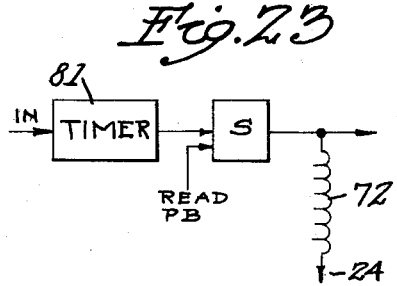
Fig. 23
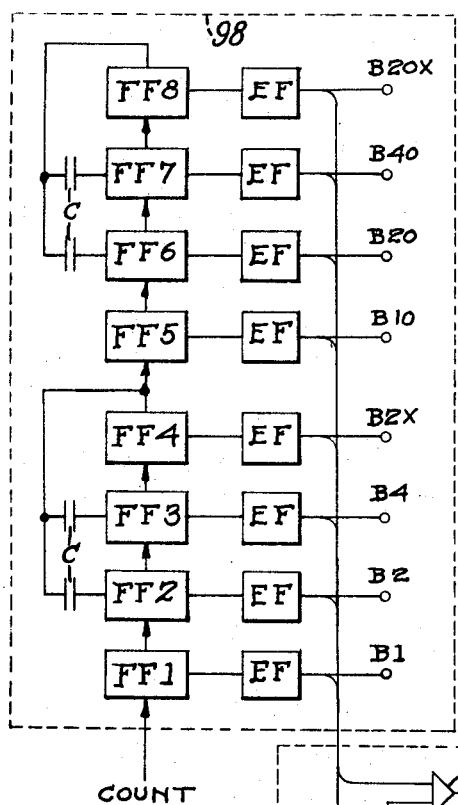
Fig. 24
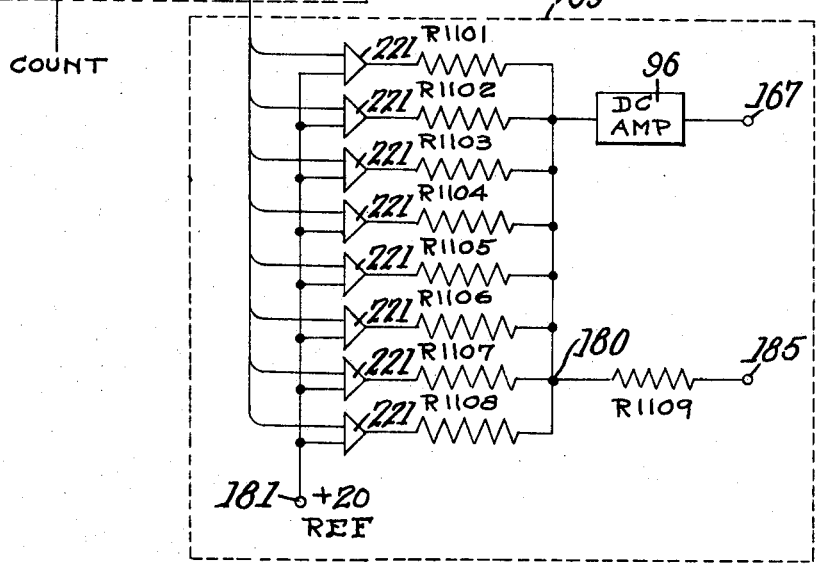
Inventors
David F. Rutland
Roger E. Lagerquist
Ernest F. Blase
By Attorneys Cadwallader, Kelly & Darcy Inventors
David F. Rutland
Roger E. Lagerquist
Ernest F. Blase
By Attorneys United States Patent Office 3,371,209
Patented Feb. 27, 1968

3,371,209
AUTOMATIC READING APPARATUS FOR THERMOLUMINESCENT TYPE RADIATION DOSIMETERS
David F. Rutland, Santa Barbara, Roger E. Lagerquist, Goleta, and Ernest F. Blase, Santa Barbara, Calif., assignors, by mesne assignments, to the United States of America as represented by the National Aeronautics and Space Administration
Filed Sept. 11, 1964, Ser. No. 395,711
7 Claims. (Cl. 250—83)

ABSTRACT OF THE DISCLOSURE

Automatic reading apparatus for thermoluminescent type radiation dosimeters having electrically controlled mechanical apparatus for automatically inserting a dosimeter within the reader, positioning the dosimeter in reading position with respect to a mirror and photomultiplier tube and ejecting the dosimeter from the reading apparatus after a reading has been made; digital means for reading and recording on paper the serial number of the dosimeter as the dosimeter is being automatically inserted within the reading apparatus; automatic means for heating the heater element of the dosimeter for a predetermined length of time slightly greater than the time required for the dosimeter to exude its characteristic glow peak while being heated; a light chopper, photomultiplier tube and AC amplifier and rectifier arranged to detect the characteristic glow of the dosimeter, chop it into glow pulses that are seen by the photomultiplier tube, and to amplify and rectify the resulting AC output of the photomultiplier tube; digital means including a pulse generator, a digital counter and control logic for determining the peak amplitude of the glow signal and storing it digitally in the counter; means including additional digital circuitry for decoding the peak amplitude that is stored in the counter and for printing it in a serial keyboard printer and for displaying in a decimal indicator tube display; means for shifting ranges in the automatic reading apparatus when the counter storage is exceeded; and means for calibrating the reading apparatus with a thermoluminescent standard.

This invention relates to thermoluminescent dosimetry and more particularly to apparatus for reading the total radiation to which a thermoluminescent dosimeter has been exposed.

A number of attempts have been made to apply the energy storage properties of thermoluminescent manganese-activated calcium fluoride ($CaF_2$:Mn) to dosimetry. $CaF_2$:Mn emits light when heated after exposure to ionizing radiation. Such radiation excites the electronic structure in the crystal, freeing electrons which are able to travel in the conduction band. Some will be trapped in the metastable levels of the $CaF_2$:Mn crystal where they remain for some time. Heat releases these trapped electrons and they may lose their energy in small increments to the crystal lattice, or they may emit light, in which case they become fixed in the crystal at the emission center. The plot of emitted light versus temperature is called a "glow curve," such as curve 50 illustrated in FIGURE 1. Curve 50 represents light emitted by electrons originally freed by gamma radiation. Both the area under high temperature peak 51 which occurs at about 280° C. for gamma radiation and its peak amplitude are proportional to the total gamma radiation dose. Heating to measure the gamma radiation dose discharges the thermoluminescent $CaF_2$:Mn, which is thereafter ready to register a new exposure as soon as it cools.

Typical prior art laboratory apparatus for recording a "glow curve" 50 for gamma radiation is disclosed in The Review of Scientific Instruments for December 1960, in an article entitled "New Thermoluminescent Dosimeter" by James H. Schulman et al. The disclosed apparatus comprises an end-on photomultiplier tube with associated power supply (about 900 volts), a direct current amplifier and a chart recorder. A blue-green optical filter transmits the light emitted by the thermoluminescent dosimeter to the photomultiplier tube and excludes most of the longer wavelength black-body radiation resulting from heating the dosimeter.

Thermoluminescent $CaF_2$:Mn dosimeters can be exposed to doses of ionizing gamma radiation ranging from 1 milliroentgen to more than 9,000 roentgens and faithfully store an indication of the total dose received. One difficulty with the above prior art apparatus is that the recorder simply cannot record doses over such a range without utilizing some means for effecting range changes which is not disclosed. Thus it is obvious that such laboratory apparatus does not lend itself to commercial utilization.

Accordingly, it is an object of the present invention to provide commercially practicable apparatus for measuring gamma radiation that does not have the disadvantages of the prior art laboratory apparatus.

A further object is to provide apparatus for measuring the total gamma dose to which thermoluminescent dosimeters have been subjected over a range of 5 milliroentgens to 9,900 roentgens.

Another object is to provide in such apparatus means for recording five decades of ionizing gamma radiation doses thereon.

It will be appreciated that commercially practicable apparatus of the character described must be capable of simple, easy and accurate calibration by those untrained in the thermoluminescent dosimetry art. Thus, it is a further object to provide in such apparatus means for simple, easy and accurate calibration.

A further object is to provide a permanent record of the gamma radiation dose to which a thermoluminescent dosimeter has been subjected.

Still a further object of the invention is to provide a system for measuring in terms of total dose the peak light intensity emitted by a heated, gamma-radiation-exposed thermoluminescent dosimeter.

Other presently available dosimetry systems involve human performance of various functions and the formation of judgments. In film badge dosimetry, for example, humans develop the exposed film badge; humans place the developed negative in a reader; humans read the negative, forming judgments when they so do; and humans make written entries of the exposure dose and the film badge number. Humans make errors in performing these functions and forming these judgments. In some instances it has been necessary that the developed film badge be removed from storage for rereading to correct such errors. In other instances whole batches of developed film badges have had to be discarded because of errors made in their development. In the present invention no human functions or judgments are performed after the dosimeter is inserted into the apparatus and until the measured dose appears on the visual display and the dosimeter identification serial number and the measured dose are printed on a tape.

Still another object of our invention is to provide a system capable of measuring the radiation dose to which a thermoluminescent dosimeter has been exposed without having humans perform any functions or form any judgments during the measuring process.

A concomitant object is to provide a system in which the serial number of the thermoluminescent dosimeter and the radiation dose to which it has been exposed are both automatically printed on a tape.

While the novel features of this invention, which are believed to be characteristic thereof, are set forth with particularity in the claims appended hereto, the invention itself, both as to its organization and method of operation together with other objects and features thereof, may be more readily understood from the following description of an exemplary system embodying the invention when read with reference to the accompanying drawings in which:

Figure 12:
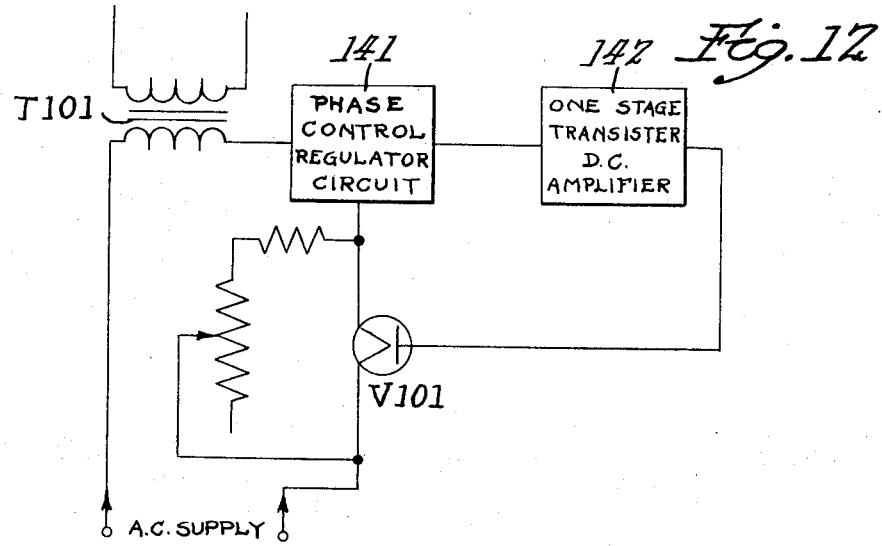
Figure 13:
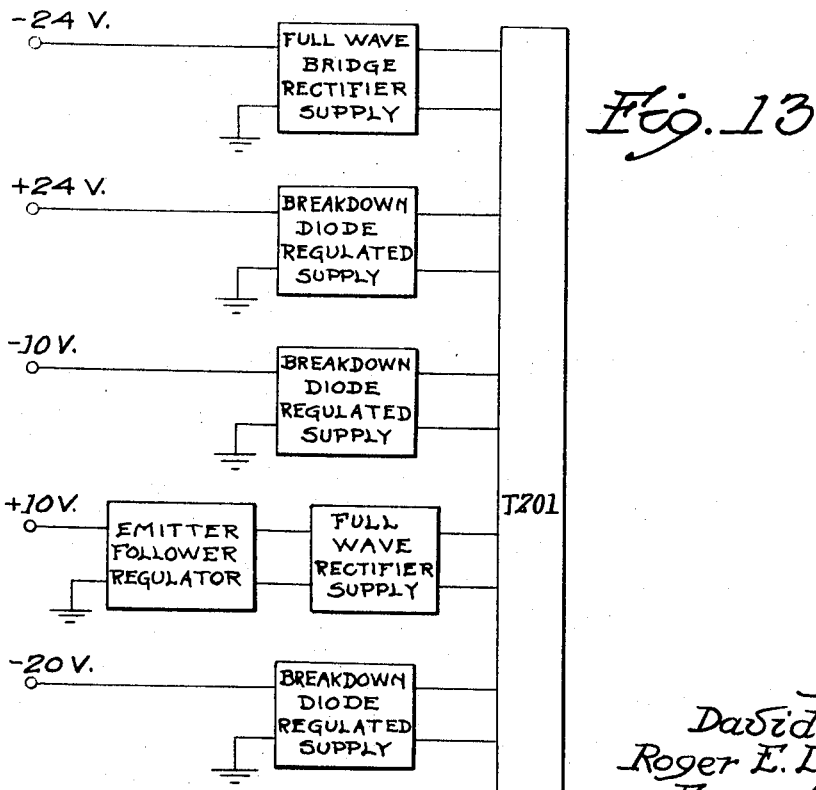
Figure 14:
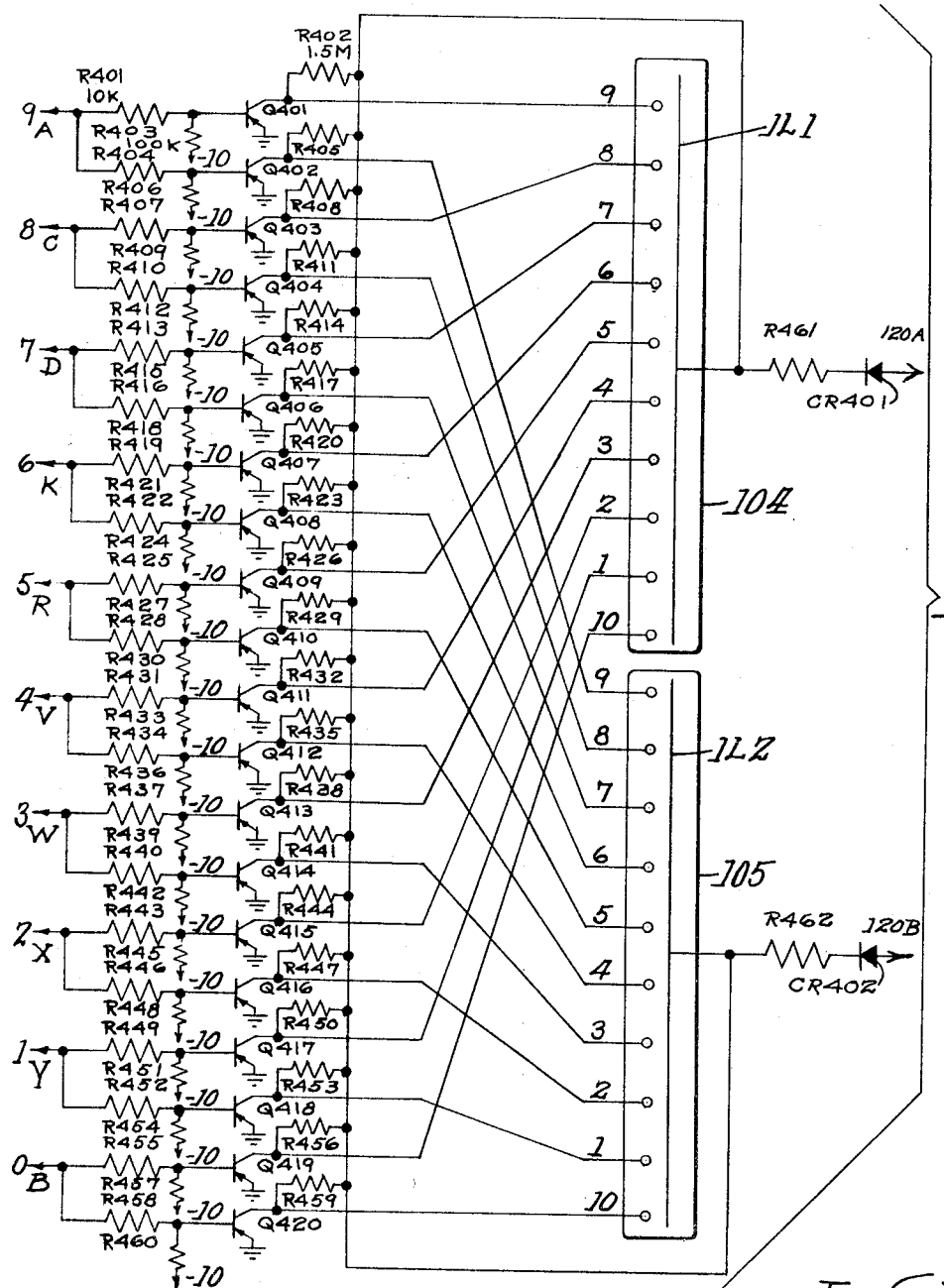
Figure 25:
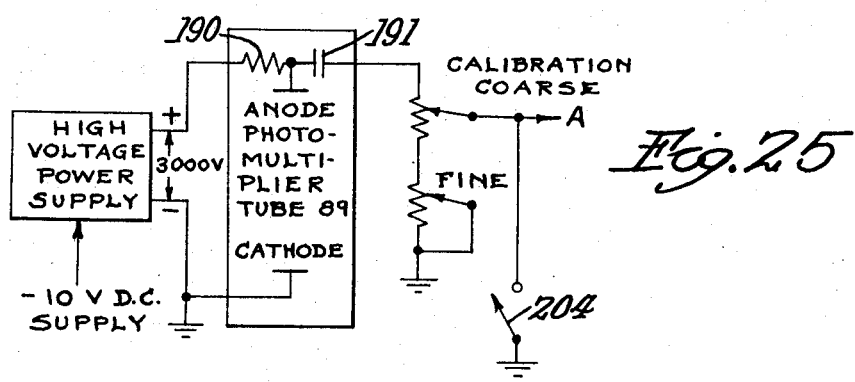
Figure 26:
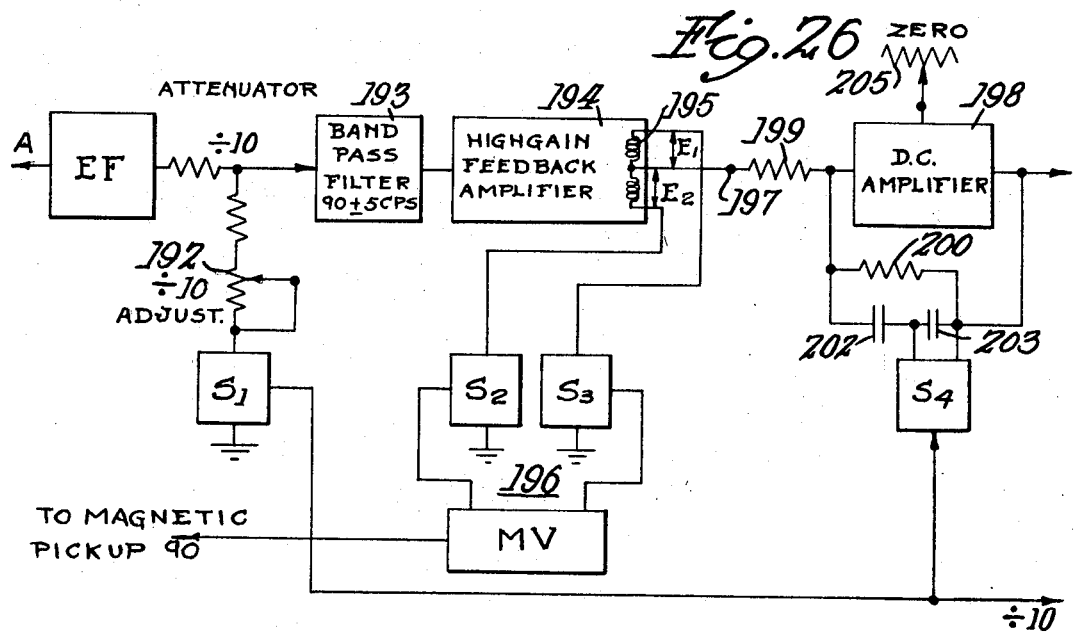

FIGURES 3A and 3B taken together comprise a block diagram of the system of our invention;

FIGURE 4 illustrates a schematic diagram of a typical time delay circuit used in the invention;

FIGURE 5 illustrates the dosimeter drive mechanism used in the reader of FIGURES 3A and 3B;

FIGURE 6 illustrates the mechanical arrangement of the drive motor and chopper disc used in the reader;

FIGURE 7 illustrates the magnetic synchronizing pickup utilized in the reader;

FIGURE 8 illustrates details of the filter advance mechanism;

FIGURE 9 illustrates the gear train that drives the filter advance mechanism of FIGURE 8;

FIGURE 10 illustrates the arrangement of cam-operated switches utilized to indicate the position of the filter advance mechanism of FIGURE 8;

FIGURES 11A and 11B illustrate a shutter mechanism used to mask the photomultiplier tube used in the reader from ambient light;

FIGURE 12 is a schematic and block diagram of the heater supply;

FIGURE 13 is a block diagram of DC voltage supply circuits used in the present invention;

FIGURE 14 is a schematic diagram of the driver circuits for operating a portion of the visual display;

FIGURE 15 is a block diagram of the decoder used in the present invention;

FIGURE 16 is a block diagram of the digit gates used in the present invention;

FIGURES 17A and 17B illustrate the identification number reading switches used in the present invention;

FIGURE 18 illustrates schematicaly and diagrammatically the solenoid driver circuits used to operate the printer in the present invention;

FIGURE 19 illustrates schematically and diagrammatically the pulse generator circuit used in the present invention;

FIGURES 20, 21, 22, and 23 illustrate diagrammatically the circuits used in the control logis of the present invention;

FIGURE 24 is a block diagram of the decimal counter used in the present invention;

FIGURE 25 is a schematic diagram of the photomultiplier circuitry;

FIGURE 26 is a block diagram of the AC amplifier and rectifier circuit; and

Figure 27:
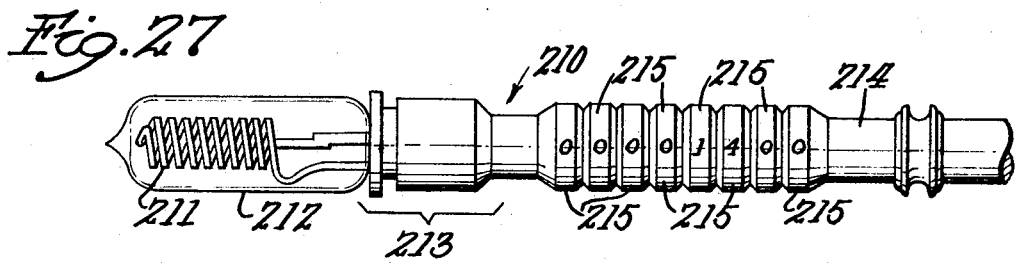

FIGURE 27 illustrates in part a thermoluminescent standard.

THERMOLUMINESCENT GLOW CURVE

Figure 1:
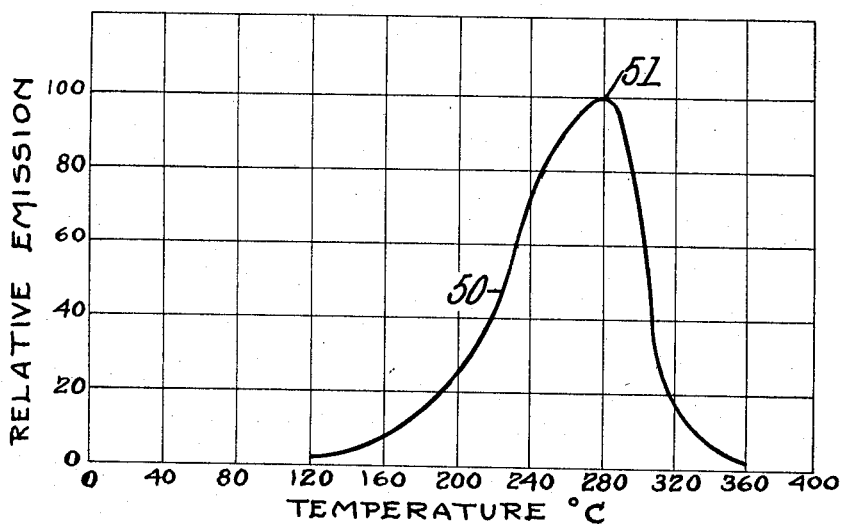
FIGURE 1 is a graph illustrating the "glow curve" of a typical thermoluminescent ($CaF_2$:Mn) dosimeter.
Figure 2:
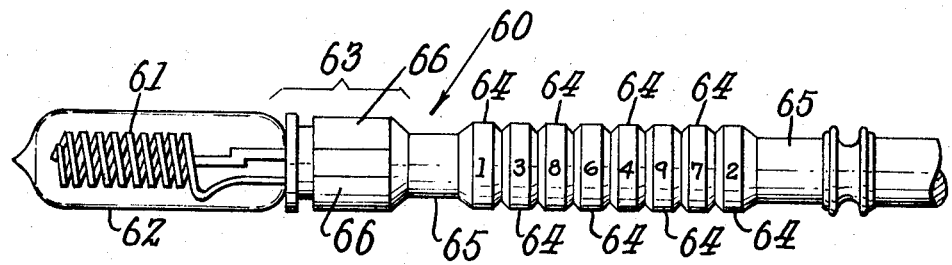
FIGURE 2 illustrates in part a thermoluminescent dosimeter.

FIGURE 1 illustrates typical glow curve 50 of thermoluminescent dosimeter 60 of FIGURE 2. Note that peak 51 of glow curve 50 occurs at about 280° C. This is the temperature at which peak light emission occurs as gamma-exposed thermoluminescent dosimeter 60 is heated to 400° C.

THERMOLUMINESCENT DOSIMETER 60

FIGURE 2 illustrates, in part, a typical thermoluminescent dosimeter 60 without its shield and case which are not shown. Dosimeter 60 comprises $CaF_2$:Mn detector element 61, glass envelope 62, base 63, and a plurality of coded digit buttons 64 mounted on handle 65. Detector element 61 comprises an electric heater coil of nichrome wire coated with a 1:1 mixture of aqueous potassium silicate and powdered thermoluminescent $CaF_2$:Mn that has hardened at room temperature to a translucent, hard, adhering mass.

Glass envelope 62 encompasses detector element 61 and may be evacuated or filled at atmospheric pressure with a gas that has a low thermal conductivity, that will not luminesce when heated, and that is inert. Argon meets these requirements. It must have a low thermal conductivity so the heater coil may be heated rapidly without losing too much heat. It must not produce light when heated, otherwise erroneous readings of exposure would be obtained. It must be inert and not react with the thermoluminescent $CaF_2$:Mn destroying its sensitivity to ionizing radiations.

Base 63 contains electrical contacts 66 that are connected to the nichrome heating element of detector element 61. Contacts 66 connect to a source of heating current in the reader of our invention as will be explained hereinafter.

The plurality of coded digit buttons 64 are part of the identification numbering system disclosed in application for United States Letters Patent No. 275,914 filed on Apr. 26, 1963, by David F. Rutland and assigned to the same assignee as the present invention and now abandoned. Each digit button 64 has a decimal digit printed on its face and is coded according to a 1–2–4–2 code, or a digital code, by one or more flats as disclosed in said application. Thus, digit buttons 64 in FIGURE 2 indicate the serial number of thermoluminescent dosimeter 60 to be 13,864,972. Means are provided for reading and printing this serial number as will be explained in greater detail hereinafter.

The electrical circuits referenced below are well known in the electronic art, are used in the electrical portion of the system of the present invention, and are hereby incorporated herein by reference.

(1) The NOR circuit illustrated in FIGURE 12.7 on page 181 of the General Electric Company's Transistor Manual, sixth edition, 1962. In the drawing, this circuit will have the reference numeral 220.

(2) The resistor-transistor gate circuit illustrated in FIGURE 7–0.5 on page 7–5 of MIL-HDBK–215, dated June 15, 1960, entitled Military Standardization Handbook Selected Semiconductor Circuits.

(3) The one-shot, direct coupled, silicon, monostable multivibrator illustrated as circuit 6–16 on page 6–59 of MIL-HDBK–215, supra. In the drawing, this circuit will have the reference characters OS.

(4) The emitter follower circuit illustrated in FIGURES 2–28 on page 52 of the book entitled Transistor Circuit Analysis, by Maurice V. Joyce and Kenneth K. Clarke, published by Addison-Wesley Publishing Company, Inc., 1961. In the drawing, this circuit will have the reference characters EF.

(5) The transistor switch circuit illustrated in FIGURES 6–4 on page 75 of the General Electric Company's Transistor Manual, supra. In the drawing, this circuit will have the reference letter S.

(6) The time delay circuit illustrated in FIGURE 13.15 on page 198 of the General Electric Company's Transistor Manual, supra.

(7) The flip-flop circuit illustrated as a two stage serial counter with diode steering in FIGURE 7–0.9A on pages 7–10 of MIL-HDBK–215, supra. In the drawing, this circuit will have the reference characters FF.

(8) The AND gate illustrated in FIGURE 7–0.1 on page 7-2 of MIL-HDBK-215, supra. In the drawing, this circuit will have the reference numeral 221.

(9) The DC amplifier illustrated in circuits 2-7 on page 2-17 of Selected Semiconductor Circuits Handbook edited by Seymour Schwartz and published by John Wiley & Sons, Inc., 1960. In the drawing, this circuit will have the reference numeral 96.

(10) The full wave bridge rectifier supply illustrated in FIGURE 8-0.1(c) on page 8.3 of MIL-HDBK-215, supra.

(11) The breakdown diode regulated supply illustrated in circuit 8-1 on page 8-42 of Selected Semiconductor Circuits Handbook, supra.

(12) The emitter follower regulator illustrated in circuit 8-2 on page 8-43 of Selected Semiconductor Circuits Handbook, supra.

(13) The phase control regulator circuit illustrated in FIGURE 8-4 on page 116 of the General Electric Company's SCR Manual second edition, 1961. In the drawing, this circuit will have the reference numeral 141.

(14) The saturated astable multivibrator illustrated in circuit 6-13 on page 6-52 of MIL-HDBK-215, supra. In the drawing, this circuit will have the reference characters MV.

READER

FIGURES 3A and 3B taken together illustrate schematically and in block diagram form the component parts of the reader used to measure the total radiation dose to which a thermoluminescent dosimeter 60 has been exposed.

When the power switch is closed, power is furnished to all circuits and to motor 69 which starts to rotate and builds up to full speed at 1800 r.p.m. When a dosimeter 60 is to be read, it is pushed through the port in the front panel (not illustrated herein) of the reader and latches into position. Push button switch 70 is depressed.

The reader then performs the following cycles in the course of reading dosimeter 60:

Cycle 1 drives dosimeter 60 into its reading position, and simultaneously senses and prints the identification number encoded on handle 65 of dosimeter 60.

Cycle 2 supplies current to the heater wire in detector element 61, causing it to heat the coating of $CaF_2$:Mn which emits light.

Cycle 3 measures the peak light emitted by the $CaF_2$:Mn, presents the measurement on a visual display, and stores this number digitally.

Cycle 4 turns off the heating current, drives dosimeter 60 out to its original position, and prints the dose.

Cycle 1

When the power switch is closed, −24 volts DC power from the DC power supply initiates operation of the time delay circuit of FIGURE 4. Those skilled in electronic circuitry will recognize that this circuit includes the time delay circuit referenced above. Resistor 52 and capacitor 53 provide a delay on the emitter of unijunction transistor 54. At the end of the delay time, which is about 30 seconds, unijunction transistor 54 fires and momentarily turns on transistor 55 which conducts causing relay 56 to operate. Relay 56 holds through its contacts 56A until the power is turned off. DC power is supplied to dosimeter drive and filter clutch solenoids 72 and 112 respectively (see FIGURES 5 and 8 respectively). This delay prevents action of dosimeter drive and filter clutch solenoids 72 and 112 until after motor 69 builds up to full speed at 1800 r.p.m.

When pushbutton switch 70 is depressed, it applies voltage to solenoid 72 in dosimeter drive mechanism 71 (see FIGURE 5). Motor 69 drives dosimeter drive mechanism 71 at a reduced speed through coupling 73, main drive shaft 74, worm gear 75 and shaft 76. Energization of solenoid 72 releases clutch 77 permitting shaft 78 to make one complete revolution, drawing dosimeter 60 into position in mirror 79. Digit buttons 64 are drawn past identification number reading switches 83, only one of which is shown in FIGURE 5.

Drive commutator 80 is illustrated schematically and not in detail in FIGURE 5 since its functioning can be easily understood by those skilled in the art. It is geared 2:1 down from shaft 78 and makes a half turn as dosimeter 60 is driven in. Drive commutator 80 also energizes identification number reading switches 83 which are operated by coded digit buttons 64 so as to furnish voltages to OR gates Q709 through Q712 (FIGURE 16) corresponding to a 1-2-4-2 code. The flats on each digit button 64 indicate according to a 1-2-4-2 code a corresponding decimal digit. Drive commutator 80 also controls digit gates 91 (see FIGURES 3A and 16) during this cycle so that the 1-2-4-2 identification code signals are directly connected to the decoder 92 (see FIGURES 3A and 15). Decoder 92 interprets the 1-2-4-2 code for each digit button 64 and supplies a voltage on one of ten terminals 150 through 159 (FIGURE 15) representing the digits 0 through 9. The ten voltages drive ten printer solenoid drivers 93 (see FIGURE 3A) that supply sufficient current to operate the solenoids in serial keyboard printer 94.

Thus, as handle 65 of dosimeter 60 moves past identification number reading switches 83, each digit button 64 is read in turn and operates printer 94 by way of digit gates 91, decoder 92, printer solenoid drivers 93 and the printer solenoids of keyboard printer 94 (see FIGURE 3A). This places the identification number in the keyboard of printer 94. After the last digit has been placed in the keyboard, drive commutator 80 operates the print-black solenoid in printer 94 causing the identification number to be printed in black on a tape.

When Cycle 1 is complete, detector element 61 is positioned in mirror 79.

Cycle 2

When drive commutator 80 arrives at the IN position, it energizes dosimeter heater supply 82 and starts dosimeter heater timer 81 (see FIGURE 3A). Heater current passes through electrical contacts 66 and the heater coil of detector element 61. During heating the $CaF_2$:Mn on detector element 61 starts to emit light which is directed by mirror 79 onto photomultiplier 89. At the end of the heating time, heater timer 81 energizes solenoid 72 (FIGURE 5) releasing clutch 77 permitting shaft 78 to make another complete revolution, ejecting dosimeter 60. As dosimeter 60 starts out, drive commutator 80 turns off dosimeter heater supply 82.

Cycle 3

The light from the $CaF_2$:Mn on detector element 61 is chopped by chopper disc 88 (see FIGURE 6) which produces equal periods of illumination and darkness on photomultiplier tube 89 at a 90 c.p.s. rate. The output of photomultiplier tube 89, a 90 c.p.s. square wave, is amplified and changed by AC amplifier and rectifier 95 (see FIGURE 3A) to a filtered DC level by means of a phase-lock rectifier circuit driven by a synchronizing signal obtained from pick-up 90 (see FIGURES 3A and 7). The synchronizing signal is generated in synchronism with the signal from photomultiplier tube 89 by means of three-lobe steel reluctance wheel 102 mounted on main drive shaft 74 operating in conjunction with magnetic synchronizing pick-up 103. (See FIGURE 7).

The direct output of AC amplifier and rectifier 95 is converted to a decimal number by means of digital voltmeter 84 (see FIGURE 3A). Digital voltmeter 84 comprises DC amplifier 96, pulse generator 97, two decade decimal counter 98, and diode current switch 99. Decimal counter 98 controls diode current switch 99 which produces a current in proportion to the decimal value standing in counter 98. Pulse generator 97 emits pulses under control of DC amplifier 96. DC amplifier 96 receives the difference current between the output current of AC amplifier and rectifier 95 and diode current switch 99. It permits pulse generator 97 to emit pulses to counter 98 only when the output current of AC amplifier and rectifier 95 is larger than the output current of diode current switch 99.

Thus, initially decimal counter 98 is cleared to zero, the output of AC amplifier and rectifier 95 is zero, and no pulses are emitted from pulse generator 97. As the $CaF_2$:Mn on detector element 61 emits light, the output current of AC amplifier and rectifier 95 rises and exceeds the output current of diode current switch 99. DC amplifier 96 allows pulse generator 97 to emit pulses which are counted in decimal counter 98. As the counting continues, the output current of diode current switch 99 increases. Counting will stop when this current exceeds the output current of AC amplifier and rectifier 95. Thus, decimal counter 98 indicates the light emitted by the $CaF_2$:Mn on detector element 61. When the peak 51 of glow curve 50 (FIGURE 1) is reached, counter 98 remains at its highest count, thus storing the dose in digital form.

The value appearing in counter 98 is displayed on two decimal indicator tubes 104 and 105 showing tens and units respectively. (See FIGURE 3A.) Counter 98 operates in a 1–2–4–2 code for each decade. These codes are translated to decimal by decoder 92. Decoder 92 handles only one decimal digit at a time, and is switched at a 60 cycle rate between the tens and units of decimal counter 98 by digit gates 91. The voltages on decimal indicator tubes 104 and 105 are switched in synchronism so as to produce the effect of a two digit display. Note that this display always indicates the output of decoder 92. Thus, when the identification number and dose are printing (Cycles 1 and 4) the display momentarily shows the entry to printer 94.

The peak light from the $CaF_2$:Mn on detector element 61 may exceed that corresponding to 99 mr., the maximum value that may be stored in decimal counter 98. When this happens, the gain in AC amplifier and rectifier 95 is reduced exactly 10 times and counter 98 reset to zero by means of control logic 100. The reading on decimal counter 98 must now be multiplied by ten in order to indicate the true dose. This is done by turning on a "0" in decimal indicator tube 106 which is immediately to the right of the unit decimal indicator tube 105.

When the dosimeter dose exceeds 990 mr., the light to photomultiplier tube 89 is now attenuated exactly 10 times by rotating a neutral density filter 111 mounted in filter disc 86 (see FIGURE 8) into the light path. Control logic 100 energizes filter solenoid 112 in filter advance mechanism 87 advancing filter disc 86 one position. (See FIGURES 3A and 8.) The operation of filter advance mechanism 87 will be explained hereinafter. If the light increases due to higher and higher doses, filter advance mechanism 87 is successively activated by control logic 100 each time the reading on counter 98 exceeds 99, thereby introducing denser filters 111 which attenuate the light by factors of $100\times$, $1000\times$ and $10,000\times$. The maximum reading corresponds to a dose of 9,900,000 mr. The factors of 10 introduced by neutral density filters 111 are displayed by adding further zeros in decimal indicator tubes 107 through 110. These zeros are controlled by filter switches 85 (see FIGURES 3A and 10) operated by cam 113 which is mounted on filter disc shaft 114.

Thus, at the end of Cycle 3, the measured dose appears visually on decimal indicator tubes 104 through 110.

Cycle 4

Dosimeter heater timer 81 allows sufficient time for the peak light emission from the $CaF_2$:Mn on detector element 61 to occur. Dosimeter drive mechanism 71 is then actuated by again energizing solenoid 72, causing a further one-half turn of drive commutator 80 and moving dosimeter 60 back to its original position.

As drive commutator 80 revolves, it produces signals to perform the dose print-out in the following sequence:

(1) Digit gates 91 are switched to the tens decade of decimal counter 98 and this digit is inserted in printer 94 by way of printer solenoid drivers 93.

(2) Digit gates 91 are switched to the units decade of decimal counter 98 and this digit is inserted in printer 94.

(3) The zero insert control in control logic 100 is energized which, if the $10\times$ attenuator has been switched in, actuates the zero printer solenoid driver 93, inserting a first zero into printer 94.

(4) The first filter switch 85 is energized which, if filter disc 86 is in the $\times 10$, $\times 100$, $\times 1000$ or $\times 10,000$ position, inserts another zero into printer 94.

(5) The second filter switch 85 is energized and inserts a zero if filter disc 86 is in the $\times 100$, $\times 1000$ or $\times 10,000$ position.

(6) The third filter switch 85 is energized and inserts a zero if filter disc 86 is in the $\times 1000$ or $\times 10,000$ position.

(7) The fourth filter switch 85 is energized and inserts a zero if filter disc 86 is in the $\times 10,000$ position.

(8) The print-red solenoid driver 93 is energized to cause printer 94 to print the dose in red in mr., after the identification serial number.

DOSIMETER DRIVE MECHANISM 72, FIGURE 5

When pushbutton switch 70 is depressed, it applies voltage to solenoid 72 in dosimeter drive mechanism 71. Operation of solenoid 72 releases clutch 77 permitting shaft 78 to make one revolution. The 2:1 gear reduction provided by gears 115 and 116 respectively, rotates drive commutator 80 one-half turn into its IN position. At the same time, carriage drive shaft 117 rotates one-half turn. Crank 118 and connecting rod 119 pull carriage 120 downward from its start position (not shown) into the position indicated in FIGURE 5. Guide rods 121 mounted through mounting plate 122 assure that carriage 120 properly locates detector element 61 within mirror 79 during each operation. When solenoid 72 is again energized, the reverse process occurs driving carriage 120 back to the start position and ejecting dosimeter 60. One-way clutch 123 prevents shaft 78 from turning backwards when force is exerted on carriage 120 while inserting or withdrawing dosimeters 60.

FILTER ADVANCE MECHANISM 87, FIGURES 8 AND 9

Motor 69 rotates main drive shaft 74 at 1800 r.p.m. Gear train 125 drive clutch shaft 126 at 102 r.p.m. When control logic 100 energizes filter solenoid 112, clutch 127 is released and shaft 128 rotates one revolution. Geneva mechanism 129 operates in the well known way and rotates filter disc 86 one-fifth revolution placing another filter 111 between photomultiplier tube 89 and chopper disc 88. Filters 111 have neutral densities of ND–0, ND–1, ND–2, ND–3 and ND–4 in that order. Thus, each succeeding filter 111 reduces the light reaching photomultiplier tube 89 by a factor of ten over the preceding filter 111.

PHOTOMULTIPLIER TUBE SHUTTER, FIGURES 11A AND 11B

When not taking a reading, it is desirable that photomultiplier tube 89 be masked from ambient light. The shutter mechanism used is illustrated in the closed position in FIGURE 11A and in the open position in FIGURE 11B. FIGURE 11A illustrates a portion of carriage 120 in its start position, where it locks shutter pawl 130, tension spring 131, shaft 132, shutter lever 134, link 135, and sliding shutter 136 in the closed position, preventing light from passing through access hole 137 of mirror 79. As carriage 120 starts its down stroke, shutter pawl 130 is released and spring 131 rotates it to the position indicated in FIGURE 11B. The linkage of shaft 132, shutter lever 134 and link 135 moves sliding shutter 136 back the correct distance so that hole 138 coincides with access hole 137 of mirror 79. On the up stroke of carriage 120, the process reverses.

HEATER POWER SUPPLY, FIGURE 12

Transformer T101 furnishes the constant current required by detector element 61. Phase control regulator circuit 141, in series with transformer T101 and the AC supply, limits the primary current to produce a constant secondary current so detector elements 61 of all dosimeters 60 will heat to 280° C. in about 10 seconds. This regulated current flows through the filament of thermionic diode V101, heats the filament, and produces an electron emission current determined by the RMS value of the filament current. The electron emission current is collected by the plate of diode V101 and controls the phase control regulator circuit after amplification by one stage transistor DC amplifier 142. The circuit of DC amplifier 142 is not shown and its operation is not explained because such circuits are well known in the electronics art.

DC VOLTAGE SUPPLIES, FIGURE 13

Various small DC voltages are required by the reader. FIGURE 13 illustrates the DC supply circuitry in which the full wave bridge rectifier supply, the breakdown diode regulated supply and the emitter follower regulator are used. These circuits are referenced hereinbefore. Note that any of the well known full wave rectifier circuits may be used with the emitter follower regulator. DC voltages utilized in the embodiment of the invention herein described as −24 volts, −20 volts, ±10 volts and +24 volts.

DECIMAL INDICATOR TUBE DRIVERS, FIGURE 14

Two read-out tubes 104 and 105 display the outputs of decoder 92 which is normally connected to decimal counter 98. The detailed display circuits are well known; hence, a discussion of their operation is omitted. The display circuits are supplied by 60 cycle voltages 120A and 120B by rectifiers CR401 and CR402. These two voltages are 180 degrees out of phase, and when rectified by the rectifiers, produce alternate ½-cycle pulses on the read-out tube anodes. The inputs 0 through 9, representing the value in the decimal counter, receive signals in synchronism with the anode voltages under the control of control logic 100. The inputs are connected to the tens decade when IL1 anode is positive, and to the units decade when IL2 anode is positive. Thus, IL1 displays the tens digit and IL2 the units digit.

DECODER 92, FIGURE 15

Decoder 92 receives binary 1-2-4-2 coded signals on input terminals B1a, B2a, B4a, and B2xa from digital gates 91 and produces a signal on one of the ten output terminals 150 through 159 which correspond to the decimal digits 0 to 9 respectively, as illustrated in FIGURE 15. Thus, an output signal corresponds to the decimal equivalent of the binary input signal. The binary input code is indicated by the digits in the input terminal designations. Transistor circuits Q601 through Q604 are inverters that perform the NOT function. Each NOR circuit 220 produces the logical function "not or." If $a_1$, $a_2, a_3, \ldots a_n$ are the positive inputs and $b$ is the negative output of a NOR circuit 220, then in Boolean algebra $$b = a_1 \cdot a_2 \cdot a_3 \ldots a_n$$

Applying this formula to the NOR circuit 220 yielding the 7 output and remembering that the output of Q601 is B2xa, the expression for the 7 output is:

$$7 = B2xa \cdot B4a \cdot B2a \cdot B1a$$

When the decimal counter indicates 7, the terms on the right side are true and the 7 output is true. Examination of the formulas for the other gates indicates that their ouputs are false when the counter indicates 7. Thus, all output signals except for the signal on terminal 157 are "false."

Similar reasoning applies to each of the binary codes representing decimal digits 0 through 9. Only that output corresponding to the equivalent decimal digit is "true," all other outputs are "false."

The zero NOR circuit 220 has an extra "zero suppress" input 160. This input is used during the printing cycle when decoder 92 drives the printer solenoid drivers 93. At the beginning and end of the print cycle, and in intervals between actuations of solenoids in printer 94, decoder 92 is disconnected from input signals by digit gates 91. The binary inputs are then all "false," representing zero, and the 0 output of the zero NOR circuit 220 would be "true" and wrongly energize the 0 print solenoid in printer 94. To overcome this difficulty, the zero suppress line is made "false" by control logic 100 thereby producing a "false" signal on terminal 160. When a zero is to be printed, the zero suppress signal at terminal 160 is removed by control logic 100.

DIGIT GATES 91, FIGURE 16

The output voltages of digit gates 91 appear at terminals B1a, B2a, B4a and B2xa which are also the input terminals of decoder 92. Digit gates 91 allow decoder 92 to be connected to the units decade of decimal counter 98, the tens decade of decimal counter 98, or to identification number switches 83.

The NOR circuits Q709 through Q712 supply "true" or "false" outputs as follows: Either (1) input voltages from identification number switches 83 at terminals 1D1, 1D2, 1D4 and 1D2x; (2) inputs from transistor circuits Q701 through Q704; or (3) inputs from transistor circuits Q705 through Q708 produce "true" outputs from circuits Q709 through Q712. During cycle 1, identification number switches 83 are energized by drive commutator 80 and the tens and units signals at terminals 161 and 162 are made "false" by control logic 100. These tens and units signals each operate one of the inputs to the NOR gates of transistor circuits Q701 through Q708. The other inputs are from the units and tens decades of decimal counter 98. When the units input is "true" at terminal 161, the binary code in the units decade of decimal counter 98 connects through terminals B1, B2, B4, B2x to terminals B1a, B2a, B4a, B2xa respectively. Similarly, when the tens input is "true" at terminal 162, the tens decade's binary code connects through terminals B10, B20, B40 and B20x to terminals B1a, B2a, B4a and B2xa respectively.

IDENTIFICATION NUMBER READING SWITCHES, FIGURES 17A AND 17B

FIGURE 17B illustrates a plan view of identification number reading switches 83 and 183 mounted in housing 240. Carriage 120 moves up and down in slot 241 of housing 240. Dosimeter 60 is drawn through housing 240 so that coded digit buttons 64 may depress one or more cams 242 of switches 83 and cam 242 of switch 183. Switch 183 is a synchronizing switch. As disclosed in said application No. 275,914, it permits operation of identification number reading switches 83 when a digit button 64 is properly located with reference thereto.

FIGURE 17A illustrates the mechanical details of single identification number reading switch 83. When operated, cam 242 depresses switch actuator 244 closing the circuit in subminiature switch 243. Preload spring 246 and cam holder spring 247 are so designed that, with proper adjustment of cam positioning screw 245, very little force, F, is required to operate switch 83.

SOLENOID DRIVERS 93, FIGURE 18

The solenoids 94A of printer 94 are actuated from twelve solenoid driver circuits 93, identical except for the 0 driver which has extra inputs. The DC supply for printer solenoids 94A is in printer 94, but is illustrated in FIGURE 18 as a full wave bridge rectifier supply, referenced herein above. In FIGURE 18, transistor switches, S, switch the solenoid lines to ground to energize each solenoid.

Normally, NOR circuits 220 have false inputs, holding the base of emitter followers, EF and switches, S, cut off. When all inputs to a NOR circuit 220 are true, its associated emitter follower, EF, and switch, S are turned on, energizing its associated solenoid 94A. Since one and only one of the inputs 0 through 9 can be true at one time, a true signal on the print enable line allows the solenoid corresponding to the proper digit (0 through 9) to be energized. The extra inputs on the zero driver are used for printing zeroes.

PULSE GENERATOR 97, FIGURE 19

In FIGURE 19, astable multivibrator MV produces square waves on terminals 163 and 164 that are 180 degrees out of phase. Alternate negative differentiated pulses are produced across CR802 and CR803. The pulses from terminal 164 are applied to transistor NOR circuit Q808.

When dosimeter 60 has been drawn into reading position, drive commutator 80 applies +10 volts to terminal 165 which supplies collector voltage to transistor NOR circuit Q808. This allows transistor NOR circuit Q808 to operate. COUNT pulses are now gated through transistor NOR circuits Q808 and Q809 to counter 98 under control of the signal on terminal 166.

COUNT pulses are provided when DC amplifier 96 produces a negative ERROR signal which indicates that the output from AC amplifier and rectifier circuit 95 is greater than the signal from diode current switch 99. This ERROR signal is applied through terminal 167 to negative AND gate circuit Q805. When this ERROR signal is positive or true, the output of gate circuit Q805 is false; the output of Q807 is true; the output of Q808 is false; and no COUNT pulses (true) are produced. When the ERROR signal goes negative (CR801 clamps it at about −0.6 volt), and the next negative pulse from terminal 163 produces a true output from AND gate Q805. Transistor circuits Q806 and Q807 are connected in a flip-flop circuit. This circuit is turned to the true state by the true signal from Q805. In the true state of the flip-flop, the output of Q807 is false. On the next cycle of the multivibrator MV, a pulse appears at terminal 164, NOR circuit Q808 now allows this pulse to pass and produce a COUNT pulse at terminal 168. This pulse also resets the flip-flop circuits of Q806 and Q807 to the false state.

If the ERROR signal remains negative, the next pulse from terminal 163 will repeat the above cycle and allow a COUNT pulse to appear. If the ERROR signal goes positive before the next pulse at terminal 163, the output of AND gate circuit Q805 remains false and no COUNT pulse appears.

The ERROR signal may change at any time not synchronous with multivibrator MV. The above circuit insures that the pulse on terminal 164 from multivibrator MV is not sliced when the error signal changes. The COUNT pulses are always gated synchronously by NOR circuit Q808.

CONTROL LOGIC 100 CIRCUITS, FIGURES 20, 21, 22, AND 23

In FIGURE 20, transistor NOR circuit 220 has the ÷10 and PRINT ZERO signals as inputs. The output of NOR circuit 220 is $\overline{(\div 10) \cdot (\text{PRINT ZERO})}$ which is inverted by Q802 to produce (÷10)·(PRINT ZERO). Thus, both inputs must be true to produce a zero insert signal. The ÷10 signal indicates that the electronic ÷10 attenuator in AC amplifier and rectifier circuit 95 has been switched in. The PRINT ZERO signal is energized by drive commutator 80 during the dose print-out and by means of this circuit and 0 solenoid driver 93 actuates the zero key on printer 94.

In FIGURE 21, the NOR circuits comprising transistors Q810 through Q813 generate the units and tens control signals applied to digit gates 91, through terminals 161 and 162, respectively (see FIGURE 16).

Signals on terminals 170 and 171 are derived from a center-tapped winding (not shown) on power transformer T201; therefore, they are 180 degrees out of phase. Diodes CR804 and CR805 produce alternate half-wave rectified voltages that drive transistor NOR circuits Q810 and Q812, and Q811 and Q813 and produce alternate positive square voltage pulses of units and tens signals on terminals 172 and 173 at a 60-cycle rate for operation of decimal indicating tubes 104 and 105.

When printer 94 is operated, drive commutator 80 connects the print enable signal on terminal 174 to +10 volts, inhibits transistor NOR circuits Q810 and Q811, and removes the square pulses from terminals 172 and 173. Terminals 172 and 173 are then normally at +6 volts or false which causes digit gates 91 (see FIGURE 16) to disconnect the outputs of counter 98 from decoder 92. When the dose is printed, print units and print tens signals on terminals 175 and 176 respectively are successively connected to +10 volts by drive commutator 80, driving the units and tens signals negative, and connecting first the tens and then the units output of counter 98 to decoder 92.

Whenever decoder 92 is used for printing units, tens, or the ID number, the zero suppress signal at terminal 177 is driven negative or true by transistor circuits Q814, Q815, and Q816 to allow printing of zeroes. The ID synchronizing signal on terminal 178 is connected to +10 volts during the ID print cycle by drive commutator 80 to make the zero suppress signal true to allow printing of zeroes.

FIGURE 22 illustrates that portion of control logic 100 which controls the ÷10 attenuator, resetting decimal counter 98, filter solenoid 112, and drive solenoid 92.

When decimal counter 98 reaches 99, the next count returns it to zero. Its output B20x (see FIGURE 22) then changes from −2 volts to +4 volts (false to true). This actuates one-shot multivibrator, OS1, which produces a positive signal for 0.15 second.

The positive signal from OS1 is inverted by NOR circuit 220 which drives the base of emitter follower EF negative. The +10 clear supply line for the decimal counter which is connected to the emitter of emitter follower EF is thus dropped from its normal +10 volts to 0 volts and clears decimal counter 98. Decimal counter 98 can also be cleared by the ID print signal from drive commutator 80 which also drives NOR circuit 220. This signal also restores the flip-flop circuit of transistors Q906 and Q907. The ID print signal is connected to +10 volts during Cycle 1.

Normally, transistor Q906 is cut off, and the flip-flop is in the false state. When decimal counter 98 first reaches 99, the output of OS1 turns transistor Q906 on, placing the flip-flop in the true state. This causes the ÷10 signal to be positive thereby reducing the AC amplifier gain. The signal B20x does not actuate OS2 as the input to NOR circuit 220 from C903 and Q906 remains false. The second and subsequent times that decimal counter 98 reaches 99, OS2 is actuated along with OS1 since transistor Q906 is now on and capacitor C903 has discharged. OS2 supplies a positive pulse of 0.30 second duration to transistor switch S and thus operates filter solenoid 112.

Thus, decimal counter 98 is cleared and the ÷10 signal actuated when decimal counter 98 first reaches 99; decimal counter 98 is cleared and filter solenoid 112 energized each time decimal counter 98 again reaches 99.

The ÷10 signal operates decimal indicator tube 106, turning on a zero in the visual display. The voltage for decimal indicator tube 106 is supplied by rectifier CR901 from a 120 volt tap on power transformer T201.

Filter solenoid 112 may be energized by the filter home signal through transistor switch S. This signal is supplied by drive commutator 80 through home filter switch 85₁ (see FIGURE 10). Filter switch 85₁ is open only when filter disc 86 is at its normal, home position. Thus, if filter disc 86 is not at home position, drive commutator 80 will turn on filter solenoid 112 until filter disc 86 rotates to its home position.

Transistor switch S (see FIGURE 23) operates drive solenoid 72. This switch is operated either by push-button 70 which supplies +10 volts or by the heater off signal supplied at the output of heater timer 81. When dosimeter 60 is in the IN position, drive commutator 80 connects the IN line to +10 volts. Current is then supplied to heater timer 81. This timer uses the property of resistance-capacitance time constants and a unijunction transistor whose operation is well known by those skilled in the electronic art. At the end of 15 seconds, the timer produces a pulse that operates transistor switch S in FIGURE 23.

TWO DECADE DECIMAL COUNTER 98, FIGURE 24

Fip-flop circuits FF1 through FF4 comprise the units decade and FF5 through FF8 the tens decade of decimal counter 98. These flip-flops are all cleared by +10 CLR (see FIGURE 22) so that the emitter follower output of the flip-flop is at +4 volts. A negative COUNT pulse applied to its input terminal causes flip-flop FF1 to change to its other state. As is well known in the art, the flip-flops in conjunction with the feedback capacitors, C, form a decimal counter of two decades, tens and units. Each decade comprises four flip-flops. The outputs of these flip-flops produce a code representing the decimal number if the four are given the weighting 1–2–4–2 for the units decade and 10–20–40–20 for the tens decade. Thus, the outputs are labeled B1, B2, B4, B2$x$, B10, B20, B40 and B20$x$, the numbers corresponding to their weighting. The emitter followers are provided between the flip-flops and the other circuits to supply sufficient power to drive these circuits.

DIODE CURRENT SWITCH 99, FIGURE 24

The DC voltage from AC amplifier and rectifier 95 appears as a positive signal at terminal 185, may range from 0 to +10 volts, and produces a current through resistor R1109.

When the diode current switch 99 current is in balance with the current through resistor R1109, point 180, a summing junction, is held within a few millivolts of ground by the feedback action of DC amplifier 96. The matching current is produced by switching under control decimal counter 98 outputs appearing at terminals B1, B2, B4, B2$x$, B10, B20, B40 and B20$x$, the proper combination of resistors R1101 through R1108 between point 180 and +20 volts reference on terminal 181. The switching is performed by diode AND gates 221.

If the current through resistor R1101 exceeds the diode current switch 99 current by one unit, or 10 microamperes, the corresponding voltage change, amplified by DC amplifier 96, produces a negative error signal to turn on pulse generator 97.

CIRCUIT OF PHOTOMULTIPLIER TUBE 89, FIGURE 25

The light emitted by the CaF$_2$:Mn on detector element 61 of thermoluminescent dosimeter 60 is chopped by chopper disc 88. The chopped light produces an AC voltage of the same frequency across load resistor 190 of photomultiplier tube 89. Coupling capacitor 191 couples the AC signal to the calibrate controls and blocks the high DC voltage on the anode of photomultiplier tube 89. Load resistor 190 and coupling capacitor 191 may be encapsulated with photomultipler tube 89.

The course and fine calibration controls illustrated provide for adjustment of the AC signal level to the input of AC amplifier and rectifier 95

The high voltage supply comprises a DC to DC converter, circuits of which are well known in the art. In the example herein described −10 v. DC is converted to 3000 v. DC.

AC AMPLIFIER AND RECTIFIER 95, FIGURE 26

The first amplifier stage of AC amplifier and rectifier 95 is emitter follower circuit EF which provides a high input impedance. The high total anode load impedance on photomultiplier tube 89 produced by the parallel combination of load resistance 190, the calibration controls, and the input impedance of emitter follower circuit EF causes a relatively high voltage to be produced at the input of AC amplifier and rectifier 95 for very low light levels.

Emitter follower circuit EF drives the ÷10 attenuator, a resistance network that produces an attenuation of 1/10 under control of transistor switch circuit S1. Transistor switch circuit S1 is turned on by a signal from control logic 100 when the capacity of decimal counter 98 exceeds 99 mr. When transistor switch circuit S1 is "OFF" the signal voltage is passed with little attenuation. When it is "ON" the signal voltage is shunted by way of ÷10 ADJUST potentiometer 192 which may be set for a reduction in amplitude to exactly one tenth the original amplitude of the signal voltage at the output of emitter follower circuit EF.

The signal is next passed through band-pass filter 193 that has a pass band sufficiently wide to pass only the frequency of the chopped light. The speed of motor 69 will change with line frequency. If the line frequency tolerance is 5%, the AC signal will vary by nearly 5 cycles. Band-pass filter 193 may be designed to produce less than 45° phase shift and 0.707 response at 90±5 cycles.

The output of band-pass filter 193 is sufficiently free from photomultiplier noise to be amplified by high gain feedback amplifier 194 comprising transistors Q1203 through Q1207 (not shown). High gain amplifier 194 produces two equal outputs E$_1$ and E$_2$ from center tapped transformer 195. These outputs are 180° out of phase and provide signals for a phase-lock rectifier circuit 196 comprising transistor switch circuits S2 and S3. The output of phase-lock rectifier circuit 196 appears at point 197 normally as a negative going full-wave rectified sine wave. The operation of phase-lock rectifier circuit 196 will be described hereinafter.

The output must be smoothed to reduce the ripple to a small value and, more importantly, to further reduce the random noise fluctuations that originate in photomultiplier tube 89 and low level circuits of the amplifier. This smoothing is accomplished by DC amplifier 198 which has a feedback network that provides an RC time constant. For example, input resistor 199 may be 47K and feedback resistor 200 may be 100K to provide an overall DC gain of approximately 2. When the ÷10 control is zero, transistor switch circuit S1 is open, amplifier 194 is in its high gain mode, and transistor switch S4 is closed, placing capacitor 202, which may have a value of 12µf., across 100K feedback resistor 200. Thus, this will provide a smoothing time constant of 1.2 seconds. When the ÷10 control signal is positive, transistor switch S1 is closed, the PM tube signal is reduced 10×, and transistor switch S4 is open, placing capacitor 203, which may have a value of 1µf., in series with capacitor 202. This produces a time constant of approximately 0.09 second. The faster time constant is sufficient to reduce the noise which is now attenuated 10× by the ÷10 attenuator and allows the system to recover quickly when neutral-density optical filters 111 are inserted to attenuate higher light levels. The output of DC amplifier 198 is adjusted so that digital voltmeter 84 reads zero with the input to AC amplifier and rectifier circuit 95 shorted by switch 204 in FIGURE 25. ZERO control 205 varies the base voltage on the input transistor of DC amplifier 198 to vary the output of DC amplifier 198.

Phase-lock rectifier circuit 196 provides the following advantages over an ordinary full-wave rectifier.

(1) Improved linearity for small signals.
(2) Rejection of noise, hum, and other signals with frequencies different from the chopped light frequency.

Since the chopped light frequency varies with line frequency, magnetic synchronizing pickup 90 is used to produce electrical pulses synchronous with chopper disc 88. Reluctance wheel 102 is adjusted so that the pulses are nominally in phase with the output signal of high gain feedback amplifier 194. The magnetic pickup signal drives multivibrator MV which produces two synchronous square waves, 180° out of phase, to switch transistor switch circuits S2 and S3. The phasing may be arranged so that when $E_1$ is negative, transistor switch circuit S3 is closed, and when $E_2$ is negative transistor switch circuit S2 is closed, thus producting a full wave rectified signal at point 197.

If, due to improper adjustment of the angle of reluctance wheel 102 on main drive shaft 74, multivibrator MV is 45° out of phase with the AC signal, the waveform at point 197 will be modified. The average value of this signal will be 0.707 of the proper, in-phase, signal. If multivibrator MV is 90° out of phase the signal at point 197 is equally positive and negative and therefore has a zero average value. Increasing the phase shift to 180° would cause the average value to be positive, and at 270° the average value would again be zero. Reluctance wheel 102 is adjusted with a line frequency of exactly 60 cycles (90 cycle chopping frequency) so as to produce 0°±10° phase difference between signal and the magnetic synchronizing signal. If the reader is operated on a line frequency differing by ±5% of 60 cycles, additional phase shift of not more than +45° will be introduced by 90 cycle band-bass filter 193. This phase shift will change the reader calibration by 0.707 which would be compensated for by the initial calibration adjustment.

It is easily seen that noise frequencies close to 90 cycles will produce a slowly varying phase shift with respect to the magnetic synchronizing signal. The signal at point 197 will therefore alternate from positive to zero to negative and back to zero. The entire cycle will be repeated at a frequency equal to the difference between the noise frequency and the magnetic synchronizing frequency. The varying voltage at point 197 is smoothed by DC amplifier 198 and frequencies higher than 1 or 2 cycles per second will be severely attenuated. For example, a 91 or 89 cycle noise signal will produce a 1 cycle signal at the output of DC amplifier 198. An 80 or 100 cycle noise signal will produce a 10 cycle output, but severely attenuated by the time constant of DC amplifier 198. Thus, all noise signals not lying in a narrow band around the chopper frequency will be effectively eliminated. Similarly, 60 cycle line pickup and 120 cycle power supply ripple in amplifier 194 is reduced to negligible proportions. The result is reduction of photomultiplier tube 89 and other noises to a very low level without attenuation of the desired chopped light signal.

PRINTER

The reader is designed to operate many types of printers, paper tape punches, and card punches.

A Victor Digimatic Printer may, for example, be connected as illustrated in FIGURE 18. A full-wave bridge rectifier supplies 24 volts full-wave DC to the reader for operation of the solenoids.

CALIBRATION, FIGURE 27

The apparatus of the present invention utilizes the thermoluminescent standard 210 disclosed in United States Letters Patent No. 3,239,665 issued on Mar. 8, 1966 to Ernest F. Blase et. al., for calibration since its light characteristic corresponds to that of a heated thermoluminescent dosimeter. Thermoluminescent standard 210 and thermoluminescent dosimeter 60 have substantially identical normalized thermoluminescent and fluorescent light output curves. Thermoluminescent standard 210 comprises element 211, glass envelope 212, base 213, handle 214, and a plurality of digit buttons 215. Element 211 comprises a coil of Nichrome wire coated with a mixture of aqueous potassium silicate, powdered thermoluminescent $CaF_2$:Mn and a powdered radioactive isotope, such as Nickel 63 or Carbon 14, that has hardened to a translucent, hard, adhering mass. As disclosed in said Letters Patent, the radioactive isotope causes the $CaF_2$:Mn to fluoresce producing a standard light output depending upon the amount of the radioactive isotope used. This light output can be calibrated to an equivalent total dose of gamma radiation. Glass envelope 212 encompasses element 211 and may be evacuated, or filled at atmospheric pressure with a gas that will not luminesce when subjected to radiation and that is inert.

The plurality of coded digit buttons 215 are similar to those used on dosimeter 60, but are here used for a different purpose. Each digit button 215 is coded according to a 1–2–4–2 code, or a digital code, by one or more flats in exactly the same manner as the digit buttons of dosimeter 60. Likewise each digit button 215 has a decimal digit printed on its face. However, the digit buttons 215 of FIGURE 27 indicate that thermoluminescent standard 210 has an equivalent gamma radiation dose of 1,400 mr. Thus, when standard 210 is inserted into the port of the reader and push button switch 70 is depressed, the printer will print 1,400 in place of the serial number, and the visual display will indicate the same equivalent dose, if the reader is calibrated.

Refer now to FIGURES 25 and 26. To calibrate, first insert thermoluminescent standard 210 and depress pushbuttons switch 70. Close switch 204 and adjust ZERO control 205 until 01 mr. appears on the visual display. Open switch 204. Then adjust the coarse and fine calibration potentiometers of FIGURE 25 until the visual display reads the same as the printed equivalent dose.

SUMMARY

It is to be understood that the foregoing description of the system of our invention is exemplary only. As will be readily apparent to persons skilled in the art, there are many alternative methods in the apparatus for securing the various functions set forth above which would work equally well with those described in the exemplary system disclosed herein. For example, that portion of the above system relating to print-out of the dosimeter serial number and dose may be eliminated, retaining only the visual display of total dose. These alternative arrangements will therefore be well within the scope of the present invention as defined in the claims appended hereto.

We claim:

1. Automatic thermoluminescent dosimetry reading apparatus for determining the total gamma radiation dose that has impinged upon a thermoluminescent dosimeter having an electrical heater element disposed adjacent thermoluminescent material that glows and produces a characteristic gamma radiation glow peak when heated above a critical temperature, which glow peak is a measure of the gamma radiation dose, said apparatus comprising automatically, in combination:

first means mounted within said apparatus for, when said dosimeter is inserted therein and when first actuated, automatically positioning said dosimeter in reading position and when actuated the next time for ejecting said dosimeter, said first means comprising a carriage in which said dosimeter is latched, an electric motor, and drive means interposed between said motor and carriage controlled by a solenoid operated clutch;

second means disposed in cooperative relationship with said first means for thereafter supplying current to said electrical heater element to heat said thermoluminescent material to a temperature above its critical temperature, said second means comprising a heater power supply and a commuator driven by said foregoing drive means, said commutator being adapted to turn on and to turn off said heater power supply;

a light sensitive device disposed in operative relation to said dosimeter to detect said glow and glow peak and to produce an electrical output proportional thereto;

third means connected to said light sensitive device for measuring said electrical output and storing it digitally, said third means comprising an AC amplifier and rectifier connected to the output of said light sensitive device and a digital voltmeter connected to the rectifier and adapted to store the value of the gamma radiation dose in a decimal counter in digital form;

timing means connected to be actuated by said second means and adapted, after a predetermined time, to actuate said first means a second time, said timing means being connected to be actuated by said commutator and adapted, after a predetermined time, to actuate said solenoid operated clutch in said drive means a second time;

fifth means interconnected between said third means and a visual display and adapted to present said stored digital dose as a decimal dose on said visual display, said fifth means comprising digit gate circuits connected to said decimal counter, a digital to decimal decoder connected to said digit gate circuits and adapted to convert the digital form of said dose to a decimal form; and said visual display comprising decimal indicator tubes connected to said decoder.

2. Automatic thermoluminescent dosimetry reading apparatus as in claim 1 for reading and printing the serial number of said thermoluminescent dosimeter appearing in a digital code of flats on the handle thereof further comprising:

a plurality of sensing switches adapted to be energized by said commutator and mounted within said apparatus in a location appropriate for sensing said flats as said dosimeter is drawn into reading position and also connected to said digit gate circuits;

a serial keyboard printer operated by printer solenoids; and a plurality of printer solenoid drivers interconnected between said printer and said decoder corresponding to the decimal digits 0 through 9 and adapted when energized to energize corresponding printer solenoids in said keyboard printer.

3. Automatic thermoluminescent dosimetry reading apparatus as in claim 1 further comprising control logic circuitry adapted to increase the range of said apparatus by a factor of ten by reducing the gain of said AC amplifier by a factor of ten and resetting said decimal counter.

4. Automatic thermoluminescent dosimetry reading apparatus as in claim 3 for further increasing the ranges of said apparatus by steps of ten further comprising:

a filter disc comprising a plurality of filters having neutral densities differing by steps of ten interposed between said light sensitive device and said thermoluminescent dosimeter; and a filter advance mechanism interposed between said electric motor and said filter disc and having a Geneva mechanism actuated by a solenoid energized by said control logic circuitry.

5. Automatic thermoluminescent dosimetry reading apparatus as in claim 4 in which said commutator and said control logic circuitry are further adapted to transfer the digital form of the dose stored in said counter to said digit gate circuits and to control the printing of said dose in said printer.

6. Automatic thermoluminescent dosimetry reading apparatus as in claim 5 further comprising a switch connected to ground and coarse and fine calibration potentiometers interconnected between said light sensitive device and said AC amplifier and a zero adjust control connected to the output of said AC amplifier, all adapted to permit calibration of said apparatus with a thermoluminescent standard having a transparent envelope encompassing a helically wound metallic ribbon coated with a mixture of thermoluminescent material and an isotope that emits ionizing radiations causing said thermoluminescent material to fluoresce thus producing light that is equivalent to a known gamma radiation dose and a handle secured to said envelope and helix, said handle having a digital code associated herewith corresponding to a decimal number representing said equivalent known gamma radiation dose.

7. Automatic thermoluminescent dosimetry reading apparatus as in claim 6 in which said apparatus further comprises a chopper disc mounted on the drive shaft of said electric motor, said disc having openings therein and being so located with respect to said dosimeter and said light sensitive device as to produce equal periods of illumination and darkness on said light sensitive device from the glow of said dosimeter at a predetermined rate, thereby producing an AC output from said light sensitive device.

References Cited
UNITED STATES PATENTS

| | | | |
|---|---|---|---|
| 3,176,133 | 3/1965 | McCall et al. | 250—83 X |
| 3,207,907 | 9/1965 | Clark | 340—347 X |
| 3,257,561 | 6/1966 | Packard et al. | 250—71.5 X |

RALPH G. NILSON, *Primary Examiner.*

WILLIAM F. LINDQUIST, *Examiner.*

S. ELBAUM, *Assistant Examiner.*

UNITED STATES PATENT OFFICE
CERTIFICATE OF CORRECTION

Patent No. 3,371,209                       February 27, 1968

David F. Rutland et al.

It is certified that error appears in the above identified patent and that said Letters Patent are hereby corrected as shown below:

In the heading to the printed specification, lines 8 and 9, "the National Aeronautics and Space Administration" should read -- the Secretary of the Navy --.

Signed and sealed this 12th day of August 1969.

(SEAL)
Attest:

Edward M. Fletcher, Jr.                  WILLIAM E. SCHUYLER, JR.
Attesting Officer                            Commissioner of Patents